Sept. 14, 1965  W. J. HASELOW  3,205,741
AUTOMATIC SAMPLER FOR MULTIPLEX SHEET HANDLING APPARATUS
Filed May 3, 1963  7 Sheets-Sheet 1
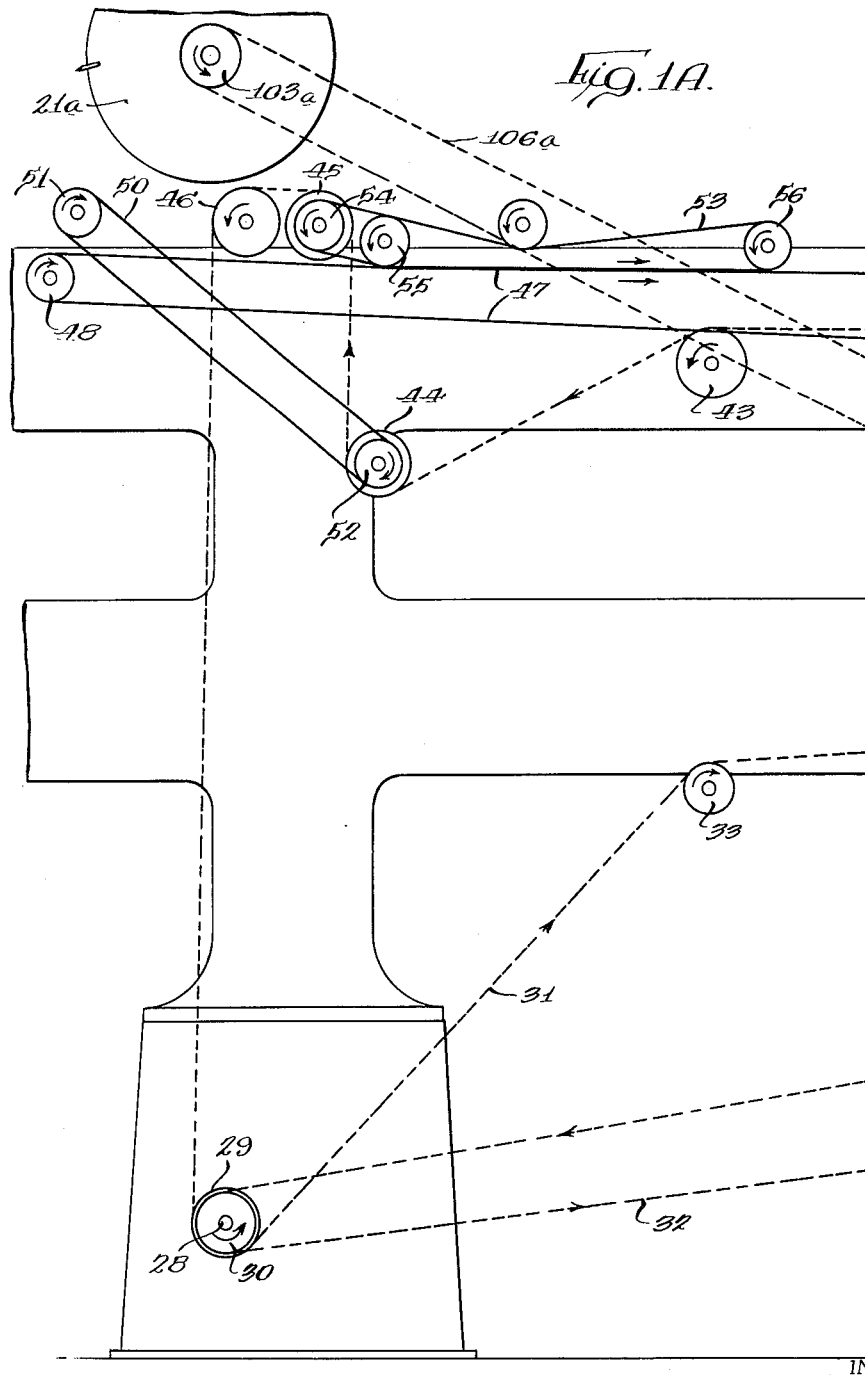
INVENTOR.
William J. Haselow
BY
Mary, Desmond & Parker
Attys

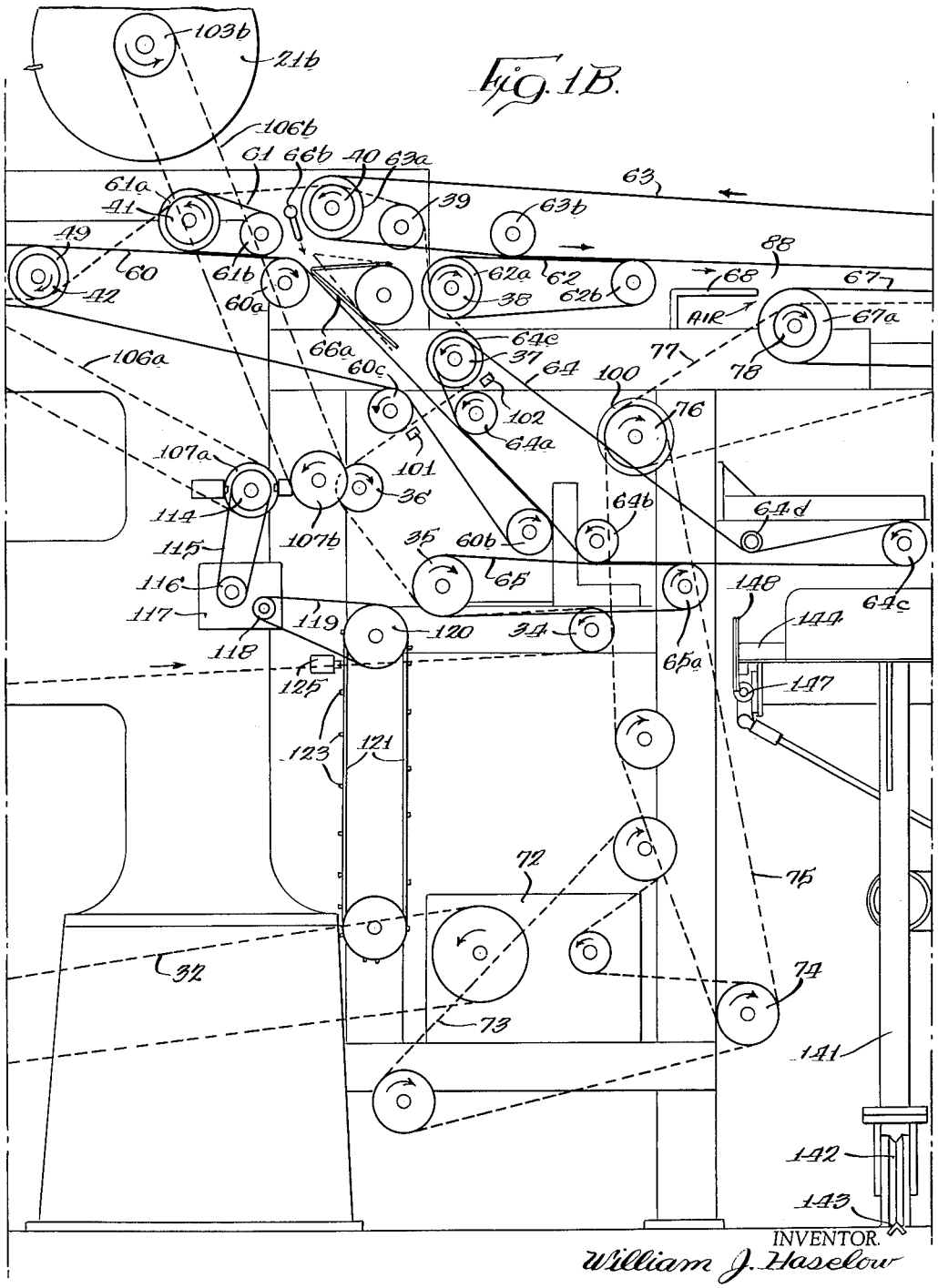

Sept. 14, 1965 W. J. HASELOW 3,205,741
AUTOMATIC SAMPLER FOR MULTIPLEX SHEET HANDLING APPARATUS
Filed May 3, 1963 7 Sheets-Sheet 3

INVENTOR.
William J. Haselow
BY
Gary, Desmond & Parker
Attys

Sept. 14, 1965    W. J. HASELOW    3,205,741
AUTOMATIC SAMPLER FOR MULTIPLEX SHEET HANDLING APPARATUS
Filed May 3, 1963    7 Sheets-Sheet 4
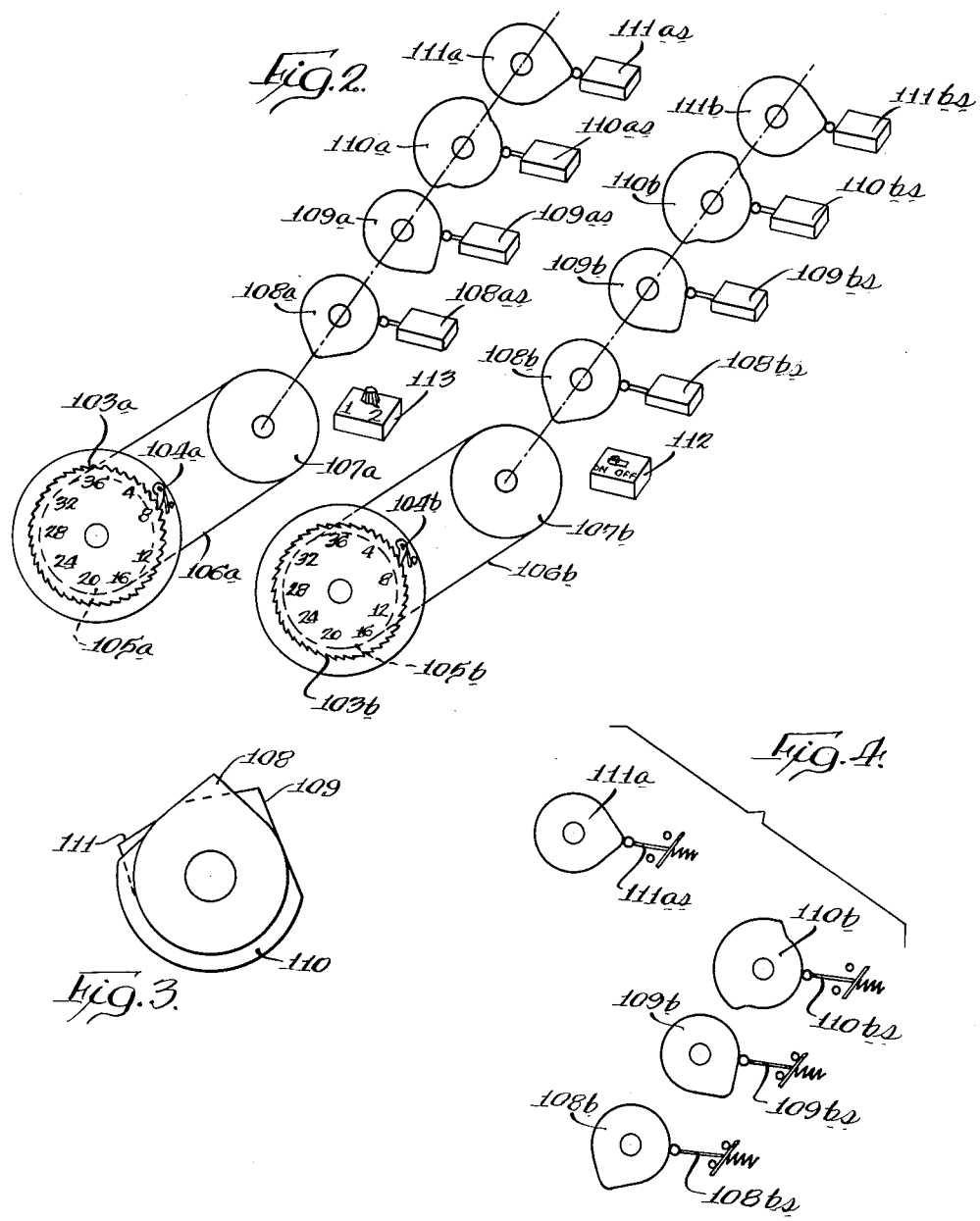
INVENTOR.
William J. Haselow
BY
Gary, Desmond & Parker
Attys Sept. 14, 1965     W. J. HASELOW     3,205,741
AUTOMATIC SAMPLER FOR MULTIPLEX SHEET HANDLING APPARATUS
Filed May 3, 1963     7 Sheets-Sheet 5
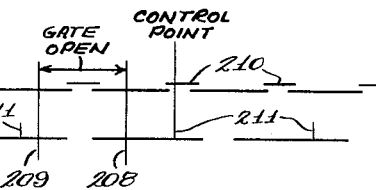
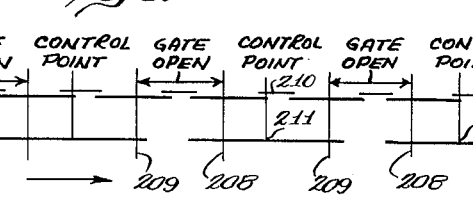
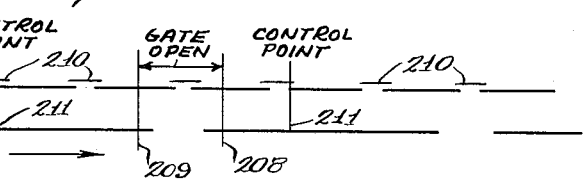
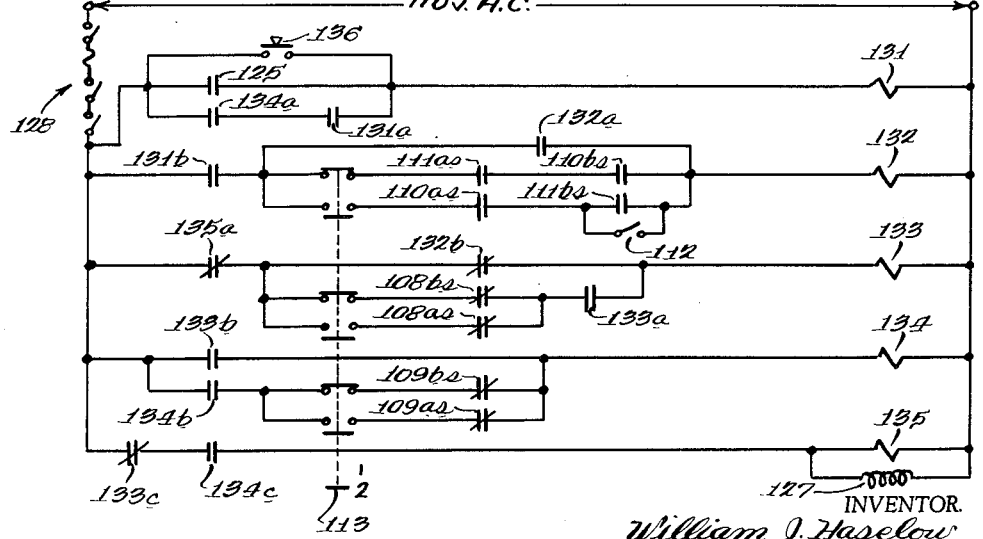
INVENTOR.
William J. Haselow
BY
Gary, Desmond & Parker
Attys

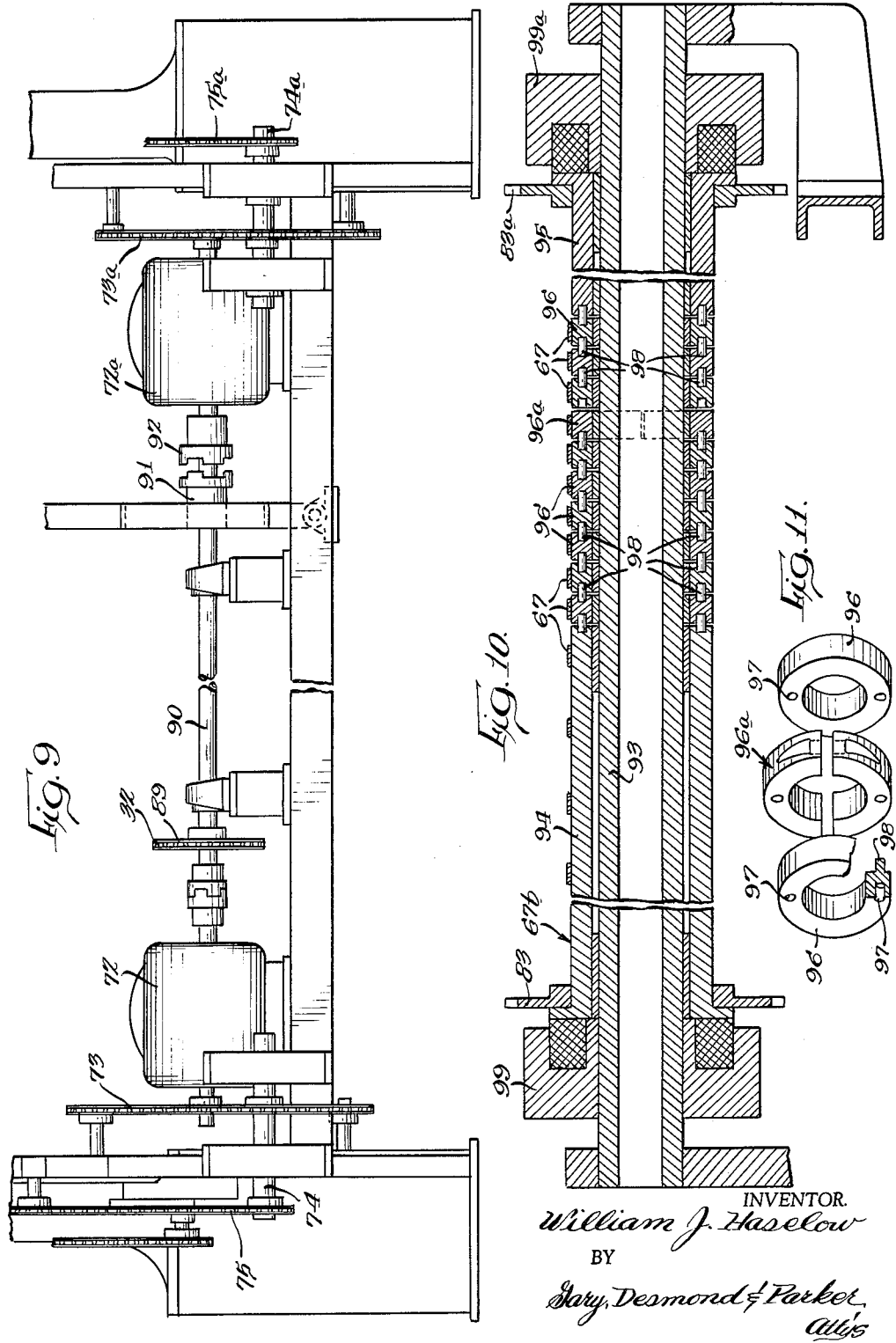

Sept. 14, 1965 W. J. HASELOW 3,205,741
AUTOMATIC SAMPLER FOR MULTIPLEX SHEET HANDLING APPARATUS
Filed May 3, 1963 7 Sheets-Sheet 7
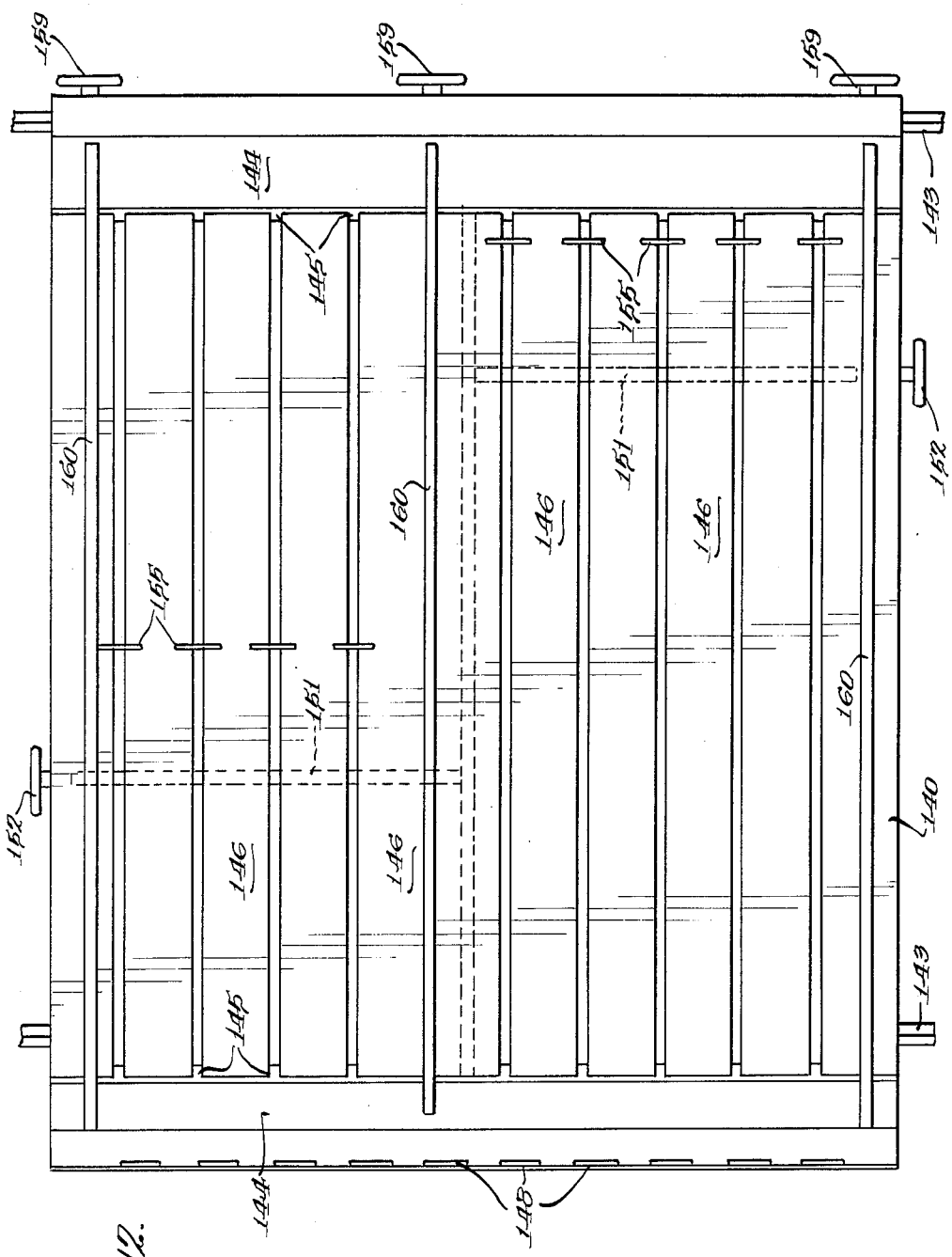
INVENTOR.
William J. Haselow
BY
Gary, Desmond & Parker
Att'ys United States Patent Office 3,205,741
Patented Sept. 14, 1965

3,205,741
AUTOMATIC SAMPLER FOR MULTIPLEX
SHEET HANDLING APPARATUS
William J. Haselow, Wisconsin Rapids, Wis., assignor to
Consolidated Papers, Inc., Wisconsin Rapids, Wis., a
corporation of Wisconsin
Filed May 3, 1963, Ser. No. 277,915
18 Claims. (Cl. 83—106)

The present invention relates to sheet handling apparatus, and particularly, to automatic statistical sampling of sheets moving over or through apparatus of the type handling a plurality of parallel rows or streams of sheets.

In my co-pending application, Serial No. 89,383, filed February 15, 1961, I have shown and described a method and apparatus for automatically obtaining a statistically accurate random sampling of the sheets moving through a sheet handling apparatus, such as a machine for cutting rolls of flexible web material (paper) into sheets. For an understanding of the advantages of statistical sampling and my method for obtaining such sampling, and as a foundation for understanding my present invention, reference is made to said co-pending application wherein I have illustrated and described sampling apparatus applied to a simplex cutter, i.e., one for cutting one or more webs of paper into sheets of any single preselected length.

The object of the present invention is to apply the principles of my prior invention to multiplex sheeting devices. By way of example, the invention is illustrated herein as applied to a duplex cutter, i.e., one wherein two or more webs are cut into any two preselected sheet lengths. Such machine includes conventional means for supporting a roll of paper, for slitting the paper into multiple webs of variable or preselectable width, for cutting each web into sheets of one of two preselectable lengths; for overlapping the cut sheets in respective streams to facilitate stacking, and for stacking the multiple sizes of cut sheets.

The problem inherent in sheet sampling on multiplex sheet handling apparatus is consequent upon the different sizes of the sheets in the two or more streams, particularly their different lengths. Because the sheets are of different lengths, the leading edges of sheets in one stream only occasionally align with the leading edges of sheets in the other streams. Consequently, it would normally be necessary to provide a number of samplers on the machine equal to the number of streams, each individually adjustable in accordance with the size of the sheets in the respective stream. While my earlier invention could be applied in multiplex for the stated purpose, it is the object of the present invention to avoid unnecessary duplication of equipment and to provide a single compact efficient apparatus for securing statistically accurate samplings of the sheets in all of the streams at one time.

In particular, it is an object of the invention to provide automatic sampling apparatus for duplex cutters and other multiplex sheet handling apparatus operating on the same basic principles as my prior invention, including unitary means for diverting sample sheets from all of the streams of sheets, and particularly characterized by control means for securing a single sample from each stream upon each operation of the sample diverting means.

Another object of the invention is to provide automatic sheet diverting means as aforesaid including a plurality of control means adjustably correlatable respectively to the sheets in the several streams in conformity with the respective length of the sheets for sensing the time at which the leading edge of each sheet in each stream approaches the sheet diverting means, and actuating means for the sheet diverting means controlled by said control means and conditioned for operation when all control means sense a time at which the leading edges of sheets in all the streams will approach the sheet diverter at about the same time.

An additional object of the invention is the incorporation in the above defined control system of means rendered operative by said control means and specifically correlated with the stream of shortest sheets for energizing said actuating means while one short sheet is passing over the diverting means and for de-energizing the same while the next following short sheet is passing through the diverting means, whereby only one short sheet is diverted from the normal path of movement, yet a significant interval of time elapses between energization and de-energization of the diverter thereby to facilitate the securing of one sample from each stream over a time range without need for exact alignment of the leading edges of sheets in all of the streams.

A further object of the invention is the provision of simplified control means for the purposes above defined, including machine driven mechanical components and a simple electrical circuit actuated thereby.

By virtue of the particular control functions above described, the present invention accommodates a statistically accurate sampling of loads of sheets on the basis of a predetermined sample number of all the streams of sheets, despite the fact that considerably more short sheets would be produced than long sheets, which is a statistically desirable result.

In addition to the foregoing, it is an object of the invention to provide improved layboy means for receiving and stacking the sample sheets diverted from the normal path of movement, said layboy including adjustable means facilitating accurate stacking, fully automatically, of a variety of sheet sizes.

As discussed in detail in my said co-pending application, diversion of sheets from the normal path of flow would, in the absence of proper control, result in interruption of sheet overlapping in the overlap section of the cutter or other apparatus and create problems with respect to stacking the sheets in the normal path of movement of the major portion of the sheets. To cure the problem, I provided means for stopping and starting the overlapping conveyor in correlation to the diversion of sheets, whereby overlap of sheets in the normal path was constantly maintained. However, this particular problem is compounded in multiplex apparatus because of the variations in sheet length, the degree of overlap and the relative positioning of the leading edges of the sheets in the several streams.

A second primary object of the present invention, therefore, is the provision of improved overlapping means for multiplex apparatus, the means being disposed in the normal path of sheet movement and including segmental conveyor means having a plurality of relatively adjustable segmental parts facilitating adjustment of the conveyor means in conformity with the width of the sheets in the respective streams, and a plurality of drive systems coupled respectively to said parts for individual control of said parts.

Another object of the invention is to provide improved multiplex overlapping apparatus as aforesaid including a plurality of variable speed drive means respectively coupled to said segmental parts, a plurality of brake and clutch means respectively coupled to said segmental parts, and a plurality of sensing means respectively coupled to said brake and clutch means and correlated to respective ones of the streams for stopping the respective part of the conveyor means when the sheet in the respective stream preceding a diverted sheet is in overlap position and for starting the respective part of the conveyor means when the sheet in the respective stream following a diverted sheet reaches overlap position.

A further object of the invention is the provision of improved segmentally adjustable conveyor means including means for independent control of the segments comprising a plurality of conveyor tapes and a drive roll for said tapes, said roll comprising a shaft, a plurality of collars journalled on said shaft, a plurality of tape mounting discs filling the space between adjacent pairs of the collars and all but one including means for interlocking engagement with one another and said collars, said one disc having bearing means at at least one face thereof and comprising a split ring having coupling means facilitating its disassembly from said shaft and its assembly on said shaft between any selected pair of the remaining discs whereby the discs may be divided into two sets of respectively variable length each coupled to a respective collar, and brake means between each collar and said shaft for independently controlling each set of discs, said discs supporting the tapes and thereby dividing the tapes into individually controllable sets to facilitate performance of individual overlapping functions.

Other objects and advantages of the invention will become apparent in the following detailed description.

Now, in order to acquaint those skilled in the art with the manner of making and using my improved multiplex sampling apparatus, I shall describe, in connection with the accompanying drawings, a preferred embodiment of the apparatus and the preferred manners of making and using the same.

In the drawings·

FIGURES 1A, 1B and 1C collectively comprise a side view of a duplex paper cutting machine equipped with a preferred embodiment of my multiplex sampling means, the sheet carrying tapes or conveyors being shown in solid lines and the tape drive chains or belts being shown in dotted lines.

FIGURE 2 is a somewhat schematic perspective view of the control means for timing energization and de-energization of the sample diverting means;

FIGURE 3 is an end view of one set of timing cams;

FIGURE 4 is a schematic perspective view of the timing cams that would be in operation at a given time;

FIGURES 5, 6 and 7 are diagramatic representations of the factors or relationships determined by the timing means and the permissivity of sample diversion with respect to three different ratios of sheet sizes;

FIGURE 8 is a schematic diagram of the electrical circuit of the sample diversion apparatus;

FIGURE 9 is an end view of the power input section of the overlapping conveyor illustrating my improved conveyor drive means;

FIGURE 10 is a longitudinal section of my improved conveyor drive roll;

FIGURE 11 is an exploded isometric view of a few of the tape supporting discs of the drive roll; and FIGURE 12 is a plan view of my improved multiplex sample layboy.

Figure 1C:
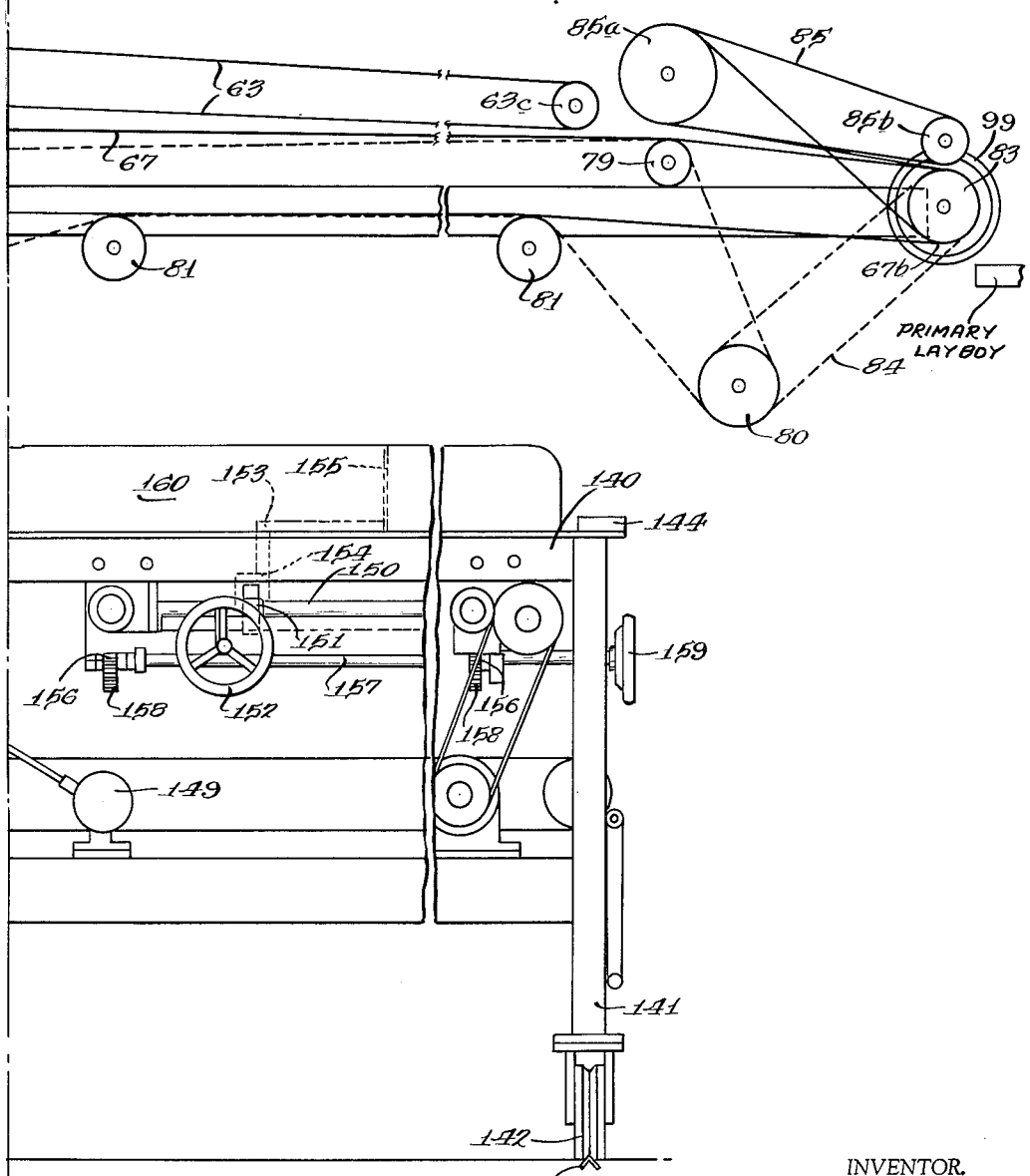

Referring now to the drawings, and particularly to FIGURES 1A, 1B and 1C, I have shown the features of my invention embodied in and as constituting the combination of a duplex paper cutting machine and an automatic sampler therefor. The cutting machine includes conventional roll supporting means, paper web guide and feed means, and means adjustable transversely of the roll web for slitting that web into two or more narrower webs of variable, preselectable widths (all of which means are conventional and not shown herein). The two or more narrower webs are fed at constant speed to respective ones of a pair of longitudinally spaced knife rolls 21a and 21b, each having a single knife. As is customary, each of the knife rolls is driven by an independent variable speed drive so that each knife roll may be driven at various speeds relative to the rate of paper web feed, thereby to accomodate cutting of each of the two or more webs into two or more sheets of preselectable lengths. Conventionally, sheet length may vary from about 20 to about 80 inches. The means for driving the knife rolls, and for adjusting the same over the range indicated, are conventional and not shown herein.

To carry the cut sheets through the machine, a power-driven floor shaft 28 extends transversely of the machine below the first knife roll 21a. The shaft 28 carries a pair of sprockets 29 and 30, which respectively receive a chain 31 for driving the high speed sheet conveyors or conveyor tapes of the cutter and a chain 32 for driving the low speed or sheet overlapping conveyors or tapes. The high speed conveyor drive chain 31 extends, in its direction of movement, from the sprocket 29 upwardly and forwardly around an idler pulley 33, forwardly and upwardly around an idler 34, rearwardly and upwardly around a sprocket 35, upwardly and rearwardly over a sprocket 36, upwardly and forwardly over a sprocket 37, upwardly and rearwardly over a sprocket 38, upwardly and rearwardly over an idler 39 and a sprocket 40, rearwardly and downwardly around a sprocket 41, downwardly and rearwardly around a sprocket 42, rearwardly and downwardly around an idler 43, rearwardly and upwardly around a sprocket 44, rearwardly over a spocket 45 and an idler 46, and thence downwardly to the sprocket 29. Each of the sprockets is, of course, mounted on a conveyor supporting shaft which also carries suitable pulley means for drivingly supporting endless conveyors, or as is customary in the paper industry, a plurality of spaced parallel endless conveyor tapes. Preferably, all of the high speed conveyor tapes are driven at the same speed.

The high speed tapes include a first conveyor or tape assembly 47 extending horizontally beneath the first knife roll 21a and supported adjacent its opposite ends by pulleys 48 and 49, the latter of which is drivingly connected to the chain-driven sprocket 42, whereby the upper run of the tape 47 is driven in the direction to carry sheets from the first knife roll 21a toward the right from said roll as viewed in FIGURE 1A. To facilitate delivery of cut sheets from the knife roll 21a onto the tapes 47, downwardly and forwardly inclined tapes 50 intersect the tapes 47 and extend rearwardly and upwardly therefrom adjacent the surface of the knife roll 21a for catching cut sheets and delivering them to the tapes 47. The tapes 50 are supported adjacent their opposite ends by a pair of pulleys 51 and 52, the latter of which is drivingly connected to the sprocket 44. To maintain the sheets in proper relation to one another on the conveyor 47, an overlying tape conveyor 53 is disposed above the conveyor 47, the tape 53 being supported and guided by pulleys 54 (which is driven by the sprocket 45), 55 and 56.

The sprocket 42 and pulley 49 also drive a long conveyor tape 60 which, in the direction of its movement, runs generally horizontally forward from the pulley 49 beneath the knife roll 21b, then forwardly and downwardly over a pulley 60a, then rearwardly around the pulley 60b, rearwardly and upwardly over a guide pulley 60c and thence back to the pulley 49 driven by the sprocket 42. The tapes 60 are thus disposed beneath the second knife roll 21b for receiving sheets cut by said knife. To retain the sheets on the horizontal run of the tapes 60, an overlying or sheet containing tape 61 is disposed immediately above the tape 60 immediately rearwardly of the pulley 60a, the overlying tape 61 being supported by a pair of pulleys 61a and 61b, the former of which is driven by the sprocket 41.

Spaced horizontally forward from the pulley 60a and the horizontal run of tape 60 is a sheet overlapping section including a first horizontally disposed tape 62 extending between a pair of pulleys 62a and 62b the former of which is driven by the sprocket 38. Disposed above the tape 62 is a long overlay or sheet confining tape 63 which extends essentially in a horizontal direction, the tape or tapes 63 being reaved over and guided by pulleys 63a (which is driven by sprocket 40), 63b and 63c. Disposed beneath the tapes 62 is another high speed tape 64 which includes an inclined portion (between pulleys 64a and 64b) paralleling the forwardly and downwardly inclined portion of the belt 60 between the pulleys 60a and 60b, whereby this portion of the tape 64 serves as means for maintaining sheets on the inclined run of the tapes 60. From the lower pulley 64b, the tape 64 extends horizontally forward, upwardly around a pulley 64c, beneath a guide roll 64d, upwardly and rearwardly and around a pulley 64e, driven by the sprocket 37, then downwardly to the pulley 64a, the latter portion of the tape 64 being disposed at an inclination to the inclined run of the tape 60 and thereby defining an entry throat leading into the space between the parallel portions of the tapes 60 and 64.

Disposed below the parallel portions of the tapes 60 and 64 for reception of sheets therefrom is another horizontally extending tape 65 which is supported at its opposite ends by a pulley 65a and a pulley coupled to and driven by the sprocket 35. As illustrated, the tape 65 extends immediately below the horizontal run of the tape 64, but terminates short of the end of said horizontal run.

As thus constituted and arranged, the high speed tapes define two paths of sheet movement, namely, a first, normal or main path horizontally along the tape 47, the horizontal portion of the tape 60 and the horizontal tape 62, and a second or sample path horizontally along the tapes 47 and 60, then forwardly downward with the tape 60 and then horizontally forward along the tape 65. To accommodate control of sheet movement between the two paths, the tape 62 is spaced horizontally forward from the horizontal run of tape 60 and a single sheet diverting means is interposed between these two tapes. In general, the horizontal portions of tapes 47 and 60 may be regarded as a sheet delivery section, and the tape 62 may be regarded as the initial portion of a sheet overlapping section, with the sheet diverting means being disposed between the two sections.

As disclosed in detail in my said co-pending application, the sheet diverting means is comprised of a movable gate 66a and air jet means 66b. The gate consists of a generally triangular sheet metal member extending horizontally across the machine and having an upper, generally horizontal surface normally aligned with the upper horizontal surfaces of the tapes 60 and 62, and a downwardly and forwardly inclined surface generally paralleling the inclined forward run of the tapes 60; the two surfaces having a common apex or point closely adjacent the pulley 60a. The gate is pivotally mounted on the frame of the machine to accommodate selective positioning of the same in a first or normal position wherein its horizontal surface is aligned with the sheet carrying sides of the tapes 60 and 62, and a second or sampling or sheet diverting position, wherein the surface paralleling the downwardly and forwardly extending run of the tape 60 intersects the horizontal path of sheet movement, thereby to divert sheets downwardly along the forward run of the conveyor 60 to the conveyor tape 65. The air jet means 66b comprises a common manifold extending transversely across the machine in the space between the tapes 61 and 63 immediately above the pulley 60a, and a plurality of jet nozzles or blow pipes directed to blow air downwardly over the pulley 60a and along the inclined forward run of the tape 60 in the space between the tape 60 and the gate 66a.

In use of the machine, the paper web is fed to the slitter and slit into two or more relatively narrow webs, one or more of which is fed at constant speed to the knife roll 21a and the other or others of which is fed to the knife roll 21b. The knife rolls are rotated at respective preselected constant speeds to cut the two or more webs into sheets of any two desired lengths. The high speed tapes, as above described, are operated at a speed somewhat in excess of the speed of web feed to the two knife rolls whereby the tapes whisk each sheet forwardly away from the respective cutter as the sheet is cut from the web. Each sheet is thus propelled forwardly along the horizontal portions of the tapes 47 and 60.

Due to the relatively rapid movement of the individual sheets away from the two knife rolls, a short gap is introduced between sheets in each of the two streams formed by the two webs. With the gate 66a in its normal or closed position as shown in FIGURE 1B, and the air jets 66b turned off, the cut sheets are fed in two parallel streams across the upper surface of the gate and onto the tape 62, with a gap between adjacent sheets in each of the two streams. When it is desired to divert samples from the normal path of sheet movement, the gate is swung upwardly to the dotted line position shown in FIGURE 1B and the air jets are supplied with air under pressure, whereby the path of normal movement of the sheets is blocked by the gate, and the gate and the air jets cooperate to divert a sheet along the secondary path of movement defined by the inclined forward run of the tape 60. The air jets are directed downwardly toward the sheet carrying side of the tapes 60 at substantially the point of divergence of the tapes from the normal horizontal path of sheet movement. Preferably, the jets emit a jet stream directed forwardly downward at a somewhat steeper angle than the forward run of the tapes 60, thereby to have the proper influence on the leading edge portion of the sheet next approaching the diverting means and to cause the air to have a path of flow downwardly over the face of the sheet for a significant distance as the sheet follows the tapes 60. The result is that the sheet to be diverted is physically pressed against and maintained in adhering relation to the sheet carrying side of the tapes 60 and moves forwardly downward without any delay and without buckling, whereby the diverted sheet will not interfere with proper movement of the sheets following. In other words, any selected sheet may be diverted in the course of normal flow and fed to the tapes 60 and 64 at essentially the speed of the tapes 60.

Other diverting means accomplishing the same result may, of course, be employed, such as a suction roll at the location of roll 60a, or a vertically reciprocal press roll cooperable with roll 60a for pressing a sheet around the corner defined by said roll.

The sheets diverted downwardly along the conveyor 60 are intended as samples of the roll of paper from which the sheets are being cut, and to this end the sheets are discharged from the conveyors 60, 64 and 65 into a sample layboy, which will be described in detail hereinafter. It is to be appreciated, of course, that only a relatively few sample sheets would be diverted into the sample layboy, and that the majority of the sheets will travel along the previously defined normal path of sheet movement.

In the illustrated cutting machine, the object is to cut rolls of paper into sheets of predetermined size and to stack the sheets in reams or loads. To this end, a layboy is provided at the tail end of the main or normal path of sheet movement, the sheets being delivered to the layboy by a main overlapping conveyor or conveyor tape 67 aligned generally with the tape 62 and extending horizontally between pulleys 67a and 67b.

The pulley 67a is spaced forwardly from the tape 62 and interposed in the space therebetween is an overlap table 68, the surface of which is disposed beneath the upper run of the tape 62 so that the trailing edge of a first sheet may fall below the surface of the tape 62, whereafter the leading edge of the next succeeding sheet may be moved over the trailing edge of the first sheet into overlapped relation thereto. The purpose of overlapping is to facilitate the stacking of the sheets in the primary layboy, the overlapping resulting in flow of sheets in a continuous or uninterrupted stream from the conveyor 67 into the layboy. To achieve overlapping, the leading sheet is slowed relative to the following sheet so that the following sheet may catch-up to and commence to overlap the leading sheet, whereafter the two sheets may proceed together at the slower speed to the layboy. Slowing down of the sheets is accomplished by a predetermined relatively slow speed drive of the tape 67.

The chain 32 driven from the floor shaft 28 comprises the power input to a variable speed reducer 72, the output of which is transmitted via a chain 73 to a sprocket assembly 74. The sprocket assembly 74 in turn drives a chain 75 that is reaved over a second sprocket assembly 76 disposed adjacent the head end of the tapes 67. The sprocket assembly 76 drives a tape motivating chain 77 which, in its direction of travel, extends from the assembly 76 upwardly and forwardly over a sprocket 78 coupled to the tape pulley 67a, horizontally forwardly to an idler 79, then downwardly and rearwardly around a sprocket 80 and returns to the assembly 76 over a pair of idlers 81. The sprocket 78 is secured to a shaft carrying the head end pulley 67a of the conveyor 67, whereby the sprockets 76 and 78 and the chain 77 drive the conveyor 67 from adjacent its head end. At its tail end, the conveyor 67 is supported by the pulley 67b which is equipped with a chain receiving sprocket 83 and a belt receiving pulley (not shown). The sprocket 83 via a chain 84 serves to couple the pulley 67b with the chain 77, and the pulley comprises drive means for an overlay or upper delivery tape 85 located above the tail end of the tape 67 forwardly (i.e., to the right) of the tape 63. Specifically, the belt pulley associated with the tape pulley 67b drives a belt 86 having a one-half twist therein, which belt is reaved over a pulley 85a secured to the head end shaft of the delivery tape 85.

The speed reducer or change speed mechanism 72 provides a variable slower speed output, whereby the slow speed tapes 67 and 85 may be driven at substantially any speed, depending upon the degree of overlap desired. As sheets of paper are transferred at relatively high speed from the high speed tape 62 to the slow speed tape 67, the sheets are slowed down by the tape 67. Preferably, the arrangement is such that each sheet may clear the tape 62 at high speed into a relatively open or clear space 88, and then be slowed down by the tapes 67 with the trailing edge of the sheet in overlap position at the plate or table 68, whereby the table comprises an overlap station. As one sheet is slowed down by the tapes 67, the following sheet is delivered at high speed by the tape 62, whereby the rapidly moving sheet consumes the gap that was created between the sheets at the knife roll and whereby the leading edge of the sheet commences to overlap the trailing edge of the immediately preceding sheet at the overlap station. Then, as the said following sheet leaves the tape 62, it too slows down to the speed of the tape 67, whereby the two sheets described are moved at the same speed in predetermined overlapped relation by the tape 67, and the sheet following these two is overlapped on said following sheet to provide a continuous overlapping action and discharge of a continuous stream of sheets into the conventional layboy at the tail end of the tapes 67. The degree of overlap may vary widely depending upon circumstances, and slow speed tape velocity is equal to high speed tape velocity less the overlap percentage. For example, if high speed tape velocity were 400 feet per minute, and a 40% overlap were desired, slow speed tape velocity would be 60% of high speed tape velocity or 240 feet per minute.

Since the present invention is concerned with multiplex sheet handling apparatus wherein a plurality of streams of different sizes of paper are flowing through the machine, it will be apparent that the overlapping arrangement for each of the streams will have to be independently or individually controllable. To this end, in the duplex cutter illustrated herein, the overlap conveyor 67 is divided (in a manner to be described) into two segments aligned respectively with the two streams of sheets of different length flowing from the cutters 21a and 21b, respectively, and each of these segments is under the control of an individual drive assembly of the character described in conjunction with reference numerals 72 through 84. Specifically, as shown in FIGURE 9, the chain 32 drives a sprocket 89 fixed on a shaft 90 which extends transversely of the machine. At one end thereof, the shaft 90 is coupled to a first variable speed drive member 72, which may be deemed to comprise the variable speed drive 72 illustrated in FIGURE 1B previously described. At its opposite end, the shaft 90 mounts a reciprocable clutch part 91 adapted to be selectively engaged with a corresponding clutch part 92 which is secured to the input shaft of a second variable speed transmission device 72a corresponding to the unit 72. The change speed transmission 72a includes output means engaged with a chain 73a which drives a sprocket assembly 74a which in turn drives a chain 75a extending to a conveyor drive assembly identical to that described in conjunction with reference numerals 76 through 84. Thus, the two segments of the conveyor tapes 67 are adapted for independent operation at individually selected speeds to provide the proper or desired overlapping action.

The clutch 91–92 is provided for the purpose of accommodating disconnection from the drive shaft 90 of the variable speed device 72a and its associated drive chains 73a and 75a, thereby to accommodate operation of only one side or segment of the overlapping conveyor means so that the cutter may be operated as a simplex cutter as well as a duplex cutter.

Division of the overlapping conveyor means 67 into two individually operable segmental parts is accomplished according to the present invention by a particular form of drive and brake pulley means for the tapes 67. Referring to FIGURE 10, I have shown the brake pulley means 67b as comprising a tubular shaft 93 fixedly secured at its opposite ends in the frame of the cutter, a first collar 94 journalled on said shaft adjacent one end thereof, a second collar 95 journalled on the shaft adjacent the other end thereof and a plurality of discs 96 journalled on the shaft 93 in the space between the adjacent ends of the collars 94 and 95. All of the discs 96, except the single disc indicated at 96a, are provided in one face thereof with a pair of holes 97 and on the opposite face thereof with a pair of outwardly projecting pins 98, whereby the discs are adapted to be interlocked with one another for conjoint rotation by virtue of the pins 98 on one disc engaging in the bores 97 in the next adjacent disc. The collar 94 is similarly provided with projecting pins 98 to engage the same with the disc adjacent thereto, and the collar 95 is provided with a pair of bores to accommodate connection therewith of the disc adjacent the collar 95.

The one disc 96a previously referred to, as shown particularly in FIGURE 11, constitutes a split ring or disc suitably having pin receiving holes in one face thereof and an opposite unobstructed face comprising bearing means accommodating relative rotation between the one disc 96a and the disc 96 adjacent thereto. The split ring 96a is provided at its opposite sides with bores extending through the two halves thereof within which bolts are adapted to be received (in countersunk relation) to couple the two halves of the ring together. These bolts may, when desired, be removed to facilitate removal of the split ring from the shaft 93, and to accommodate reassembly of the ring on the shaft between any two of the plurality of discs 96, whereupon the split ring due to its bearing face divides the discs 96 into two separate sets respectively connected to the drive collars 94 and 95. As shown in FIGURE 10, the tapes 96 are supported on the collars 94 and 95 and on the discs 96, whereby the split ring may be adjusted as desired to divide the tapes into two separately operable parts or segments.

The two parts or segments of the overlapping conveyor means are independently driven via the collars 94 and 95 by respective drive sprockets (83 and 83a for the brake pulley and 78 and 78a for the drive pulley). To the extent thus far described, the drive pulley 67a is identical to the brake pulley 67b. The brake pulley differs from the drive pulley in that a pair of brakes 99 and 99a, preferably electromagnetic brakes, are mounted on the opposite ends of the shaft 93 in cooperative relation to the collars 94 and 95, respectively. The brakes 99 and 99a are independently operable, thereby selectively to stop and accommodate rotation of the respective collars 94 and 95 and the discs 96 coupled to the respective collar.

To accommodate stopping of the two conveyor segments, each of the two drive means includes a clutch 100 (see FIGURE 1B) associated with the sprocket 76 for selectively disconnecting the respective conveyor chain 77 from the respective drive chain 75. For the purposes described in my co-pending application, the clutch means 100 is located adjacent the head end of the conveyor drive, and the brake means 99 is located adjacent the tail end of the conveyor drive, with the result that there is no backlash of the chains 77 and 84 when stopping the same and that there is no lost motion of said chains in starting the same. Consequently, when a respective pair of clutch and brake means 99 and 100 are actuated substantially simultaneously to release the clutch and apply the brake, a sheet can be stopped instantaneously with its trailing edge in overlap position at the overlap station 68, and when the clutch and brake means are de-energized (thereby to release the brake and apply the clutch), again substantially simultaneously, tape drive commences immediately where it left off without lost motion thereby to insure proper overlapping of sheets despite the diversion of a sample sheet from the stream of sheets flowing from the respective knife roll.

The respective pairs of brake and clutch means 99–100 are controlled by a pair of coordinating means or sensing means substantially identical to the corresponding means provided in the apparatus of my said co-pending application, the two sensing means being correlated respectively to the two pairs of brake and clutch means. In its preferred embodiment, the sensing means each comprise photoelectric cell means disposed adjacent the path of sample sheet movement as the sample is being diverted from the main path of sheet flow. Specifically, a photoelectric cell 101 is disposed rearwardly and below the conveyor 60 in a position between adjacent tapes and at a location spaced from the pulley 60a by a distance correlated to the distance of the overlap table 68 from said pulley. Since the high speed conveyor 62 continues to operate during sample sheet diversion, the sheet preceding the sample must clear the tape 62 before the overlapping tapes 67 are stopped; yet the tapes 67 must be stopped with the sheet in overlap position. By locating the photoelectric cell 101 in the path of sample sheet movement, where it will sense the passage of the leading edge of the sample (which of course moves in predetermined correlation to the preceding sheet) control over stopping and starting of the respective segment or part of the slow speed tapes can be exactly correlated to sheet movement. In the present embodiment, the photoelectric cell is disposed approximately one-half the distance of the table 68 from the point of divergence of the sample sheet from the main path. A light source 102 for the cell is located to the side of the tapes 60 and 64 opposite the cell, whereby the cell is adapted to sense the presence of a sample sheet on the sample conveyor means 60–64.

As will be obvious, the two segments or parts of the overlapping conveyor 67 are aligned respectively with the two streams of sheets flowing from the two knife rolls, and two of the photocell assemblies 101–102 are disposed respectively in alignment with the two segments of the conveyor 67 to sense the diversion of a sample sheet from the respective stream of sheets. Consequently, when the leading edge of a sample sheet intersects the light beam from the respective source 102, the respective photoelectric cell 101 triggers a control circuit (not shown) whereupon the respective pair of clutch and brake means 99–100 is energized to release the clutch and apply the brake. The brake remains on and the clutch remains released so long as a sample sheet intersects the beam of light from the respective source 102, but as soon as the trailing edge of the sample sheet clears the beam, a signal is transmitted to the control circuit which in turn de-energizes the respective brake and clutch pair to release the brake and apply the clutch in timed or coordinated relation to the sheet following the sample, so that the respective part or segment of the conveyor 67 is started when the sheet following the sample commences to overlap the sheet preceding the sample at the overlap station 68. Thus, the two segments or parts of the overlapping conveyor are individually controllable as to operating speed, stopping and starting, thereby to accommodate substantially any desired variation in sheet size between the two streams and substantially any required or desired differential and sheet spacing in the degree of overlap in the two streams.

While I prefer, as above described, to divide the overlapping conveyor means into two segments or parts, each of which is individually operable and controllable, thus resulting in duplication of some elements of the machine, I find that accurate control of overlapping is so essential as to warrant such duplication. In the case of sample selection, however, I prefer to accomplish this function without duplication of effort or parts, thereby to provide a more efficient and compact machine and also particularly to facilitate ready variation in the respective widths of the two streams of sheets without necessitating a complex adjustment of the width of the sample diverting gate and air jet means. In order to achieve the stated desiderata it is necessary to provide an exact correlation between the sheets in the two streams in order to secure a sample from both streams, but only a single sample from each stream, each time the sheet diverting means is operated. To this end, I provide coordinating or control means illustrated particularly in FIGURE 2.

According to the present invention, each of the knife rolls 21a and 21b is equipped with an adjustable timing wheel 103a and 103b, respectively. The two timing wheels are preferably identical and are each suitably in the form of a ratchet wheel having a toothed periphery adapted for cooperation with a respective pawl 104a and 104b carried by the respective knife roll, each wheel having thirty-six teeth on its periphery to accommodate setting of the same to any one of thirty-six positions relative to the knife on the respective roll. Each timing wheel carries a sprocket 105a–105b having a one-to-one driving ratio via a chain 106a–106b with a respective one of a pair of sprockets 107a–107b.

The sprockets 107a–107b each constitute part of two identical cam assemblies, each of which assemblies consists of a common shaft, a gate opening cam 108a–108b, a gate closing cam 109a–109b, a short sheet proximity cam 110a–110b and a long sheet proximity cam 111a–111b each disposed for actuation of a respective switch 108as–108bs, 109as–109bs, 110as–110bs and 111as–111bs. Associated with the two sets of switches are a pair of control switches, namely a simplex-duplex selector switch 112 and a selector switch 113 settable to either of positions 1 or 2 depending upon which of the two knife rolls is cutting the long sheet and which is cutting the short sheet. For example, in FIGURE 2, assuming the first knife 21a is cutting the long sheets and the second knife 21b is cutting the short sheets, the selector switch 113 is set to position 2. The circuitry is such that disposition of the selector switch 113 in position 2 cuts left-hand switches 108as, 109as and 110as out of the circuit and switch 111as into the circuit, and connects right-hand switches 108bs, 109bs and 110bs in the circuit and cuts switch 111bs out of the circuit. The result is shown in FIGURE 4 wherein, in effect, the drive from the first knife 21a operates only the long sheet proximity cam 111a, while the second knife 21b operates the short sheet proximity cam 110b, and the gate timing cams 108b and 109b.

The relative disposition of the cams of each of the two sets on their respective cam shafts is depicted in FIGURE 3. The gate opening and closing cams 108 and 109 are both single lobe cams set on the shaft to provide nearly 360 degrees spacing between the gate opening lobe and the gate closing lobe in the direction of cam rotation. Due to the one-to-one drive of the cams from the knife roll, this arrangement accommodates energization of the sheet diverting means 66 for a period of time equal substantially to the time required for one sheet to pass the diversion means. However, the cams 108 and 109 are not correlated to the leading and trailing edges of a single sheet, but are adjustably set (in the case of the short sheet) by the respective ratchet and pawl 103–104 to intermediate portions of successive sheets in the stream.

The short sheet proximity cam 110 comprises a relatively long arcuate cam surface, preferably about 160 degrees in arcuate extent, having its central point disposed opposite the lobes of cams 108 and 109 and centered between said lobes, whereby the short sheet proximity cam senses a substantial sheet area in the center of the space between the relative positions of the cams 108 and 109, specifically (in the case of the short sheets) an area in the sheet stream bridging the gap between successive sheets.

The long sheet proximity cam 111 in each set, like the cams 108 and 109, in a single lobe cam. Since it is not in use when the other cams of the respective set are in use, its positioning relative thereto is not critical. However, I prefer to set this cam with its lobe leading the center of the cam surface of the cam 110 by 90 degrees in the direction of cam rotation, thereby to facilitate correlation of the long sheet proximity cam 111 on one shaft with the short sheet proximity cam 110 on the other shaft through the media of the ratchets 103a–103b.

In use of the apparatus, with the knife 21b cutting the short sheets and the knife 21a cutting the long sheets, and with the selector switch 113 set in position 2 to provide the cam and switch arrangement depicted in FIGURE 4, the cams 108b, 109b and 110b are preferably set relative to the knife roll 21b, by the ratchet 103b, so that the gate opening cam 108b is disposed to energize the sheet diverting means 66 at about the middle of each short sheet (see lines 208 in each of FIGURES 5, 6 and 7), the gate closing cam 109b is set to deenergize said means at about the middle of the next succeeding short sheet (see lines 209 in FIGURES 5, 6 and 7) and the short sheet proximity cam 110b senses an area in the sheet stream bridging each gap between sheets, as depicted by the lines 210 in FIGURES 5 to 7. The long sheet proximity cam 111a is then set relative to the long sheets, by appropriate adjustment of the ratchet 103a, so that said cam senses a location on each long sheet spaced forwardly from the trailing edge thereof by a distance equal approximately to the length of the short sheets, as depicted by the lines 211 in FIGURES 5 to 7.

By applying reference numerals to each of the teeth on the ratchet wheels 103a and 103b, and correlating cam shaft settings to these reference numerals, a chart has been prepared for rapidly setting both ratchet wheels for a wide variety of short and long sheet lengths, specifically over the entire range from 20 inches to 80 inches. Thus, both cam shafts may be quickly set to proper position relative to the sheets in the respective streams.

As will presently be described, a simultaneous closing of the switches 110bs and 111as by the short and long sheet proximity cams 110b and 111a (as indicated by the term "control point" in FIGURES 5 to 7 at each coincidence of a line 211 with a line 210) will result in energization of the sheet diverting means 66 upon next passage past switch 108bs of the short sheet gate opening cam 108b, whereby the gate 66a will be opened and the air jets 66b will be supplied with air (see "gate open" in FIGURES 5 to 7) during passage of the trailing end portions of the next short sheet and the leading end portions of the short sheet following that; which time interval coincides with passage by the sheet diverting means of the trailing end portion of one long sheet and the leading end portion of the next succeeding long sheet, whereby the sheet diverting means will divert a single long sheet and a single short sheet upon each operation thereof under the control of cams 108b, 109b, 110b and 111a.

It is to be understood, of course, that if the knife 21a is cutting the short sheets and the knife 21b is cutting the long sheets, the control cams in active use will be 108a, 109a, 110a and 111b, but that the operation will otherwise be as above described.

The practicality of and advantages attained by energizing the sheet diverting means 66 at an intermediate portion of one sheet (one each of the short and long sheets) and de-energizing the same intermediate the length of the next succeeding sheet is described in detail in my copending application. In brief, the short and long sheets passing over the gate 66a are not adversely affected by opening of the gate or the passage of air through the jet 66b, and those sheets continue on their way to the overlapping conveyor 67 in a normal manner. As soon as the leading edge of each succeeding short and long sheet approaches the conveyor pulley 60a, the pressure of the air emitted from the jets 66b forces the leading edge of each sheet around the corner formed by the pulley 60a and presses the same positively against the surface of the inclined run of the tapes 60 (without buckling, delay or lost motion) and holds the same on said tapes until control over the leading edge of each sheet is gained by the lower portions of the gate 66a and/or the tapes 64. After this, the air may be discontinued and the gate may be closed on the trailing end portions of the diverted sheets without adverse effect, whereby the diverted short and long sheets continue down the conveyors 60, 64 and 65 to the sample layboy; and whereby the gate is disposed for passage of succeeding short and long sheets in their normal paths to the overlapping conveyor 67.

Since it is the intention in the illustrated embodiment of the invention to divert only a random sampling of sheets from the two streams, it will be appreciated that the sheet diverting means 66 is not to be operated upon each occurrence of a "control point," as this is too frequent an occurrence. For example, with a sheet length ratio of one-to-three between the short and long sheets, as illustrated in FIGURE 5, a "control point" occurs at every third short sheet and every second long sheet; with a ratio of one-to-two, as shown in FIGURE 6, at every other short sheet and every long sheet; and with a ratio of two-to-three, as shown in FIGURE 7, at every third short sheet and every long sheet. To control the number of samples to be taken, i.e., the frequency of operation of the diverting means 66, I provide an overriding control for the timing means in the form preferably of a random sample frequency control substantially identical to that described in my copending application.

Referring to FIGURE 1b, the cam shaft driven by the sprocket 107a and chain 106a carries a sprocket 114 meshed with a chain 115 which drivingly engages the input sprocket 116 of a variable speed transmission unit 117 mounted on the machine frame outwardly of the conveyor tapes. The output sprocket 118 of the unit 117 is meshed with a chain 119 which drivingly engages a sprocket 120 for a sample frequency device in the form of an endless belt 121 reaved over a pair of pulleys and carrying a plurality of selectively positionable buttons 123. Buttons 123 may be added to and removed from the belt and may be positioned thereon as desired for the purpose of controlling the frequency and the pattern of sample sheet selection. As the belt is moved by the variable speed unit 117, the buttons 123 sequentially engage and actuate a control switch 125.

The purpose of the switches thus far described is, of course, to effect control over the sample diverting means 66. As described in my copending application, the gate 66a may be actuated by a pneumatic piston and cylinder assembly (not shown), and this assembly and the air jets 66b may suitably be under the control of a solenoid operated air valve (not shown). A preferred control circuit is illustrated in FIGURE 8, wherein the switches are illustrated in circuit with the coil 127 of a solenoid operated valve for controlling the supply of air to the gate operating assembly and to the air jets.

With reference to FIGURE 8, the control circuit comprises five principal parallel branches, namely (from top to bottom) a sample frequency or master control branch including the frequency control switch 125, a timing branch including the switches actuated by the proximity cams, a gate opening branch, a gate closing branch, and a solenoid control branch including the coil 127 of the solenoid operated air valve. All five branches are connected in parallel with one another across the lines of a conventional electric power supply, and the circuit as a whole is under the control of suitable on-off switches and fuse means, indicated generally at 128.

Also included in the circuit are five relays 131, 132, 133, 134 and 135 having their coils connected, respectively, in the five parallel branches above described, the coils of relays 131 through 134 being connected in series circuit in their respective branches and the coil of relay 135 being connected in parallel with the coil 127. The relay 131 includes two normally open contact sets 131a and 131b connected respectively, in the frequency control branch and the proximity cam switch branch. The relay 132 includes a normally open contact set 132a connected in the proximity cam switch branch and a normally closed contact set 132b connected in the gate opening switch branch. The relay 133 includes two normally open contact sets 133a and 133b connected, respectively, in the gate opening switch branch and the gate closing switch branch, and a normally closed contact set 133c connected in the solenoid coil branch. Relay 134 includes three normally open contact sets 134a, 134b and 134c connected, respectively, in the frequency control branch, the gate closing switch branch and the solenoid coil branch. Relay 135 comprises a single normally closed contact set 135a included in the gate opening switch branch.

The sample frequency control branch is comprised of a parallel array of, first, a manually operated sample switch 136, second, the automatically operated sample frequency switch 125, and third, a holding circuit comprised of normally open contact sets 134a and 131a; said array being connected in series with the coil of relay 131.

The proximity cam switch circuit also includes a parallel array of three circuits; first, a holding circuit comprised of the normally open contact set 132a, second, a first selective proximity cam switch circuit comprised of a series connection of normally open switches 111as and 110bs, and third, an alternate proximity cam switch circuit comprised of a series connection of normally open switches 110as and 111bs, the latter two circuits being under the selective control of the switch 113. This parallel array is, in turn, connected in series with a normally open contact set 131b and the coil of relay 132. Also included in this branch is the duplex-simplex selector switch 112, which is suitably an on-off switch connected in parallel with switch 111bs.

The gate opening switch branch includes a parallel connection of the two gate opening switches 108as and 108bs, which are normally closed and under selective control of the switch 113. This parallel connection in turn is connected in series with normally open contact set 133a, and the composite is connected in parallel with a holding circuit comprised of normally closed contact set 132b. The parallel circuitry is in turn connected in series with the normally closed contact set 135a and the coil of relay 133.

The gate closing switch branch is similar to the gate opening branch and includes a parallel connection of the two gate closing switches 109as and 109bs, which are normally closed and under selective control of the switch 113. This parallel connection in turn is connected in series with normally open contact set 134b and the composite is connected in parallel with a holding circuit comprised of normally open contact set 133b. The parallel circuit is then connected in series with the coil of relay 134.

The solenoid coil branch is comprised of a parallel array of coil 127 and the coil of relay 135 connected in series with normally closed contact set 133c and normally open contact set 134c.

In use of the circuit in conjunction with the particular cutter arrangement previously described, the selector switch 112 is set to duplex or open position and the selector switch 113 is set to position 2, whereby to connect switches 108bs, 109bs, 110bs and 111as in the circuit and to cut switches 108as, 109as, 110as and 111bs out of the circuit, all as shown in FIGURE 8. In this condition, the coil of relay 133 is energized via normally closed contact sets 135a and 132b, thus closing contact set 133a, causing energization of relay 134 via contact set 133b and opening the solenoid coil circuit via contact set 133c. Energization of relay 134 in turn causes closing of contact sets 134a, 134b and 134c.

When either the manual sample switch 136 or the automatic sample frequency switch 125 is closed, relay 131 is energized causing closing of contact set 131a and thereby establishing a holding circuit via contacts 134a and 131a for maintaining relay 131 energized despite the fact of only momentary actuation of the switch 136 or 125. Contact set 131b is thereupon closed to condition the proximity cam switch circuit for operation.

When the short and long sheet proximity cam switches 110bs and 111as are closed simultaneously, as previously described, relay 132 is energized thereby closing contact set 132a to establish a self-holding circuit despite subsequent opening of the switches 111as and 110bs. Energization of relay 132 also results in opening the normally closed contact set 132b, thereby to condition the gate opening circuit for operation. Upon the next occurrence of the lobe of cam 108b passing the switch 108bs, said switch is opened thereby de-energizing relay 133 and resulting in opening of contact sets 133a and 133b and closing of contact set 133c, thereby respectively to maintain relay 133a de-energized, to condition the gate closing circuit for operation and to close the circuit, via contacts 133c and 134c, to the coil 127 of the solenoid operated control valve for the sheet diverting means 66. The latter means is thereupon energized to divert a long sheet sample and a short sheet sample to the sample layboy. Energization of coil 127 also results in energization of relay 135 and thus opening of normally closed contact set 135a, thereby insuring continued de-energization of relay 133 and continued energization of the sheet diverting means until the gate closing cam switch 109bs is actuated.

After sample sheet diversion has been initiated in the manner previously described, the cam 109b opens the switch 109bs; thereby denergizing relay 134 and opening contact sets 134a, 134b and 134c, the latter operating to de-energize the solenoid coil 127 and thereby close the gate 66a and discontinue the supply of air to jets 66b. Also, contact set 135a is reclosed. Opening of contact set 134a results in de-energization of relay 131, thereby opening holding contacts 131a and also opening contacts 131b to render the proximity cam switch circuit inoperative. This in turn results in de-energization of relay 132 and opening of contacts 132a and closing of contacts 132b. The relay 133 is thus energized again to close contact set 133b and re-energize relay 134, thereby to return the circuit to its initial condition for repetition of the operations above described upon the next closing of either of the sample switches 125 or 136.

Operation of the described circuit with the selector switch in position 1, i.e., with the first knife 21a cutting short sheets and the second knife 21b cutting long sheets, is the same as above described with the exception that switches 108as, 109as, 110as and 111bs operate in place of switches 108bs, 109bs, 110bs and 111as, respectively.

When using the cutter for simplex operations, i.e., cutting one or more webs of paper into sheets of a single length, the first knife 21a is employed, the selector switch 113 is set to position 1 and the switch 112 is set to "simplex" or "on" position. The switch 112 shunts the second knife long sheet proximity cam 111bs, whereby timing of the sheet diverting means is controlled by switches 108as, 109as, and 110as, the operation otherwise being the same as above described except that there is no need for correlation of two different sheet lengths via two proximity cams. If desired, the circuit could also be aranged to provide for simplex operation with the second knife 21b by providing a shunting switch (like switch 112) for the first knife long sheet proximity cam switch 111as.

From the foregoing, and particularly from the disclosures of FIGURES 5 to 7, it will be appreciated that the present invention provides for diversion from each of the streams of cut sheets of a single sample upon each actuation of a single sheet diverting means. Moreover, the obtaining of a single sample from each of the streams is not reliant upon precise alinement of the leading edges of the sheets in all of the streams, but requires only a general alinement falling within a range almost equal to the length of the shortest sheets whereby "control points" occur quite frequently despite the variations in the lengths of the several sheets, thereby to facilitate sampling upon each actuation of the sample frequency switch 125. This obviates the problem, a marked statistical disadvantage, that the switch 125 might be actuated several times without selection of samples, thereby destroying the accuracy of the statistical sampling and/or rendering void the statistical basis for sampling.

As the samples are diverted from the normal path of sheet movement, the same are delivered via the tapes 60, 64 and 65 to the sample layboy, which is constructed as illustrated in FIGURES 1b, 1c and 12 to receive the sheets from the respective streams and stack the same in neat, separate piles. The layboy comprises a rectangular horizontal frame 140 supported just below the level of the horizontal portion of tapes 64 and 65 by legs 141. The legs are provided at their lower ends with grooved wheels 142 which ride on respective tracks 143 secured to the floor transversely of the cutter, whereby the sample layboy may be moved transversely between a sheet receiving position alined with the tapes 64 and 65 and an unloading position spaced laterally from the machine. The frame 140 comprises an essentially open framework of side and end rails, the end rails being partially covered by transverse wooden boards 144 or the like to define lips 145 for removable reception of longitudinally extending surfacing boards 146.

The head end rail of the frame 140 mounts thereon a transverse rock shaft 147 to which a plurality of upright jogger fingers 148 are attached, the shaft being oscillated by a motor and eccentric drive 149 to cause the fingers to oscillate in a generally horizontal direction for the purpose of jogging the sample sheets into proper position in the layboy. Mounted on the bottom of the side rails of the frame 140, in the present embodiment of the invention, are a pair of racks 150 each of which mounts a bar 151 extending transversely of the frame beneath the lips 145, the two racks cooperating with the two bars mounting respective pinions, each having a hand operating wheel 152, whereby the bars 151 may individually be reciprocated longitudinally of the frame. Detachably rested on each bar 151 are a plurality of stop fingers 153 each comprising a relatively heavy L-shaped base having an inverted U-shaped mounting portion 154 adapted to rest on the bar, and an upwardly extending blade 155 which is relatively narrow at its base and then broadens out to form an end stop of relatively large area for engagement by the leading edges of the sample sheets. One bar 151 is, of course, set for the long sheets and the other for the short sheets.

Also mounted on the bottom of the frame 140, at opposite ends of the paths of movement of the bars 151, are a pair of transversely extending racks 156 which slidably support three longitudinally extending laterally movable divider assemblies each of which includes a rotary shaft 157 slidably supported on the racks, a pair of pinions 158 on the shaft engageable with the respective racks for traversing the shaft, a hand wheel 159 for rotating the shaft, and a divider blade or plate 160 carried by the shaft and extending upwardly through the open top of the frame 140 longitudinally thereof. By appropriate manipulation of the hand wheels 159, the center divider 160 may be alined with the dividing line between the two webs being cut, thereby to separate the two sets of sample sheets, and the outside dividers may be set relative to the center divider in accordance with the respective widths of the sheets being sampled. If the cutter is employed with rolls of paper of one size only the layboy may be made of the same size and the outboard dividers may be fixed to the sides of such layboy, leaving only the center divider adjustable.

In use, the center and one side divider 160 are appropriately set relative to the webs of paper being cut, and one of the bars 151 is appropriately set relative to the jogger fingers 148 to define a space between the jogger fingers 148, the stop fingers 155 and the two dividers 160 of a size substantially identical to the sheets being cut at one side of the cutter. The other divider 160 is then appropriately set relative to the center divider, and the other bar 151 is appropriately set relative to the jogger fingers 148 to define a second space of a size substantially equal to the sheets of paper being cut on the other side of the cutter. The surface of the table is then filled in by placing longitudinal boards 146 between the dividers 160, the boards being spaced apart to accommodate passage therebetween of the reduced base portions of the stop fingers or blades 155. As sample sheets are delivered to the layboy by the tapes 65 and 64, the two sheets are received by the layboy between the respective dividers 160, the leading edges of the sheets are abutted against the respective stop fingers 155, and the jogger fingers 148 tap the trailing edges of the sheets to cause the same to be accurately aligned in neat, orderly, separate piles in the two spaces defined by the dividers 160 and the fingers 148 and 155. When the load of paper has been cut, the entire layboy is conveniently moved transversely of the cutter to a position outwardly thereof to facilitate retrieval of the two stacks of sample sheets, whereupon these sheets may be examined to facilitate grading of the entire load on a statistically accurate basis.

In view of the foregoing detailed description, it is believed apparent that all of the objects and advantages of the invention have been shown herein to be attained in a convenient, economical and practical manner.

While I have shown and described what I regard to be the preferred embodiments of my invention, it will be appreciated that various changes, rearrangements and modifications may be made therein without departing from the scope of the invention as defined by the appended claims.

I claim:

1. Automatic sheet diverting means for multiplex sheet handling apparatus having a plurality of streams of sheets moving in side-by-side relation in a given direction, the sheets in each stream being of the same length and the sheets of the different streams being of different lengths, means for selectively diverting sheets in said streams from their normal path of movement, a plurality of timing means operatively correlated respectively to the streams, said timing means each including control means periodically rendered operative in timed relation to movement of sheets in the respective stream for sensing the time at which the leading edge of each sheet in the respective stream will approach said sheet diverting means, and actuating means for said sheet diverting means controlled by said control means and conditioned thereby for actuation when the control means of all the timing means sense a time at which the leading edges of sheets in all of said streams will approximately simultaneously approach said sheet diverting means.

2. Automatic sheet diverting means for multiplex sheet handling apparatus having a plurality of streams of sheets moving in side-by-side relation in a given direction, the sheets in each stream being of the same length and spaced apart and the sheets of the different streams being of different lengths, means for moving the sheets in said streams in a normal path, means for selectively diverting sheets in said streams from said normal path, a plurality of timing means operatively associated with said sheet moving means and selectively adjustable in conformity with the length of the sheets in respective streams, said timing means each including control means periodically rendered operative in timed relation to movement of sheets in the respective stream for sensing the time at which the leading edge of each sheet in the respective stream will approach said sheet diverting means, and actuating means for said sheet diverting means controlled by said control means and conditioned thereby for actuation when the control means of all the timing means sense a time at which the leading edges of sheets in all of said streams will approach said sheet diverting means within an interval of time less than that required for movement of two of the shortest sheets past said sheet diverting means.

3. Automatic sheet diverting means for multiplex sheet handling apparatus having a plurality of streams of sheets moving in side-by-side relation in a given direction, the sheets in each stream being of the same length and spaced apart and the sheets of the different streams being of different lengths, means for selectively diverting sheets in said streams from their normal path of movement, a plurality of timing means operatively correlated respectively to the streams, said timing means each including control means periodically rendered operative in timed relation to movement of sheets in the respective stream for sensing the time at which the leading edge of each sheet in the respective stream will approach said sheet diverting means, and actuating means for said sheet diverting means controlled by said control means and conditioned thereby for actuation when the control means of all the timing means sense a time at which the leading edges of sheets in all of said streams will approach said sheet diverting means within an interval of time less than that required for movement of two of the shortest sheets past said sheet diverting means, the timing means correlated with the stream of shortest sheets including means rendered operative by all said control means for energizing said actuating means after movement of the leading edge of a first short sheet past said sheet diverting means and for de-energizing said actuating means before movement of the trailing edge of a second short sheet past said sheet diverting means.

4. Automatic sheet diverting means for multiplex sheet handling apparatus having a plurality of streams of sheets moving in side-by-side relation in a given direction, the sheets in each stream being of the same length and the sheets of the different streams being of different lengths, a single sheet diverting means extending transversely of said streams for selectively diverting sheets simultaneously from all said streams, a plurality of timing means operatively correlated respectively to the streams, the timing means correlated to the stream of sheets of shortest length including a first operator for actuating said sheet diverting means as an intermediate portion of each of the shortest sheets passes said sheet diverting means, a second operator for de-energizing said sheet diverting means as an intermediate portion of each succeeding one of the shortest sheets passes said sheet diverting means and control means rendered operative for a substantial part of the time intervening between the functions of said operators, the remainder of said timing means each including control means rendered operative in timed relation to movement of the sheets in the respective streams in accordance with a spacing from the trailing edge of each sheet in the respective stream generally correlated to the length of the shortest sheets, and means normally rendering said sheet diverting means inoperative, said last-named means being rendered operative by simultaneous operation of all said control means to accommodate actuation of said sheet diverting means by said operators within an interval less than that required for movement of the next two succeeding sheets of the shortest length past said sheet diverting means.

5. Automatic sheet diverting means for multiplex sheet handling apparatus having a plurality of streams of sheets moving in side-by-side relation in a given direction, the sheets in each stream being of the same length and the sheets of the different streams being of different lengths, a single sheet diverting means extending transversely of said streams for selectively diverting sheets simultaneously from all said streams, a plurality of timing means operatively correlated respectively to the streams, the timing means correlated to the stream of sheets of shortest length including a first operator for actuating said sheet diverting means as an intermediate portion of each of the shortest sheets passes said sheet diverting means, a second operator for de-energizing said sheet diverting means as an intermediate portion of each succeeding one of the shortest sheets passes said sheet diverting means and a proximity cam having a relatively long cam surface located between said operators, the remainder of said timing means each including a proximity cam operated in timed relation to movement of the sheets in the respective streams and correlated to a location on each sheet in the respective stream spaced from the trailing edge thereof by a distance generally equal to the length of the shortest sheets, means normally rendering said sheet diverting means inoperative, said last-named means being operatively associated with said proximity cams and being rendered operative only upon simultaneous actuation by all said proximity cams, and control means operated by said last-named means for conditioning said sheet diverting means for actuation by said operators only within an interval less than that required for movement of two sheets of the shortest length past said sheet diverting means.

6. Automatic sheet diverting means for duplex sheet handling apparatus having relatively short sheets and relatively long sheets moving in parallel respective streams in a normal path of movement; a single sheet diverting means extending transversely of the streams for selectively diverting sheets simultaneously from both the streams, a pair of timing means operatively correlated respectively to the two streams, said timing means each including cam means operated in timed relation with and in conformity to the length of the respective sheet, the timing means operatively correlated to the short sheets including a first cam for operating said sheet diverting means as each short sheet passes said sheet diverting means, a second cam for de-energizing said sheet diverting means as the next succeeding short sheet passes said sheet diverting means and a short sheet proximity cam having a relatively long cam surface located between said first and second cams, the timing means operatively correlated to the long sheets including a long sheet proximity cam correlated to a location on each long sheet spaced from the trailing edge thereof by a distance approximately equal to the length of the short sheets, and control means normally rendering said sheet diverting means inoperative and including means operated by both said proximity cams for conditioning said sheet diverting means for operation by said first cam as the next short sheet passes said sheet diverting means and for de-energization by said second cam as the succeeding short sheet passes said sheet diverting means.

7. Automatic sheet sampling means for duplex cutters having a pair of knives for respectively cutting two webs into relatively short sheets and relatively long sheets and means for conveying the sheets in parallel streams in a normal path of movement; a single sheet diverting means extending transversely of said conveying means for selectively diverting sheets simultaneously from both said steams, a pair of timing means operatively connected respectively to said knives, said timing means each including cam means operated in time with the respective knife and in conformity with the length of the respective sheet, the timing means operatively associated with the short sheet knife including a first cam for operating said sheet diverting means at approximately the time the mid-point of each short sheet passes said sheet diverting means, a second cam for de-energizing said sheet diverting means at approximately the time the mid-point of the next short sheet passes said sheet diverting means and a short sheet proximity cam having a cam surface of about 160 degrees extent centered between said first and second cams, the timing means operatively associated with the long sheet knife including a long sheet proximity cam operatively correlated to a point on each long sheet spaced from the trailing edge thereof by a distance approximately equal to the length of the short sheets, and control means normally rendering said sheet diverting means inoperative and including means operated by both said proximity cams for conditioning said sheet diverting means for energization by said first cam and de-energization by said second cam during movement past said sheet diverting means of the next two short sheets.

8. Automatic sheet sampling means for duplex cutters having a pair of knives for respectively cutting two webs into relatively short sheets and relatively long sheets and means for conveying the sheets in parallel streams in a normal path of movement; a single sheet diverting means extending transversely of said conveying means for selectively diverting sheets simultaneously from both said streams, a pair of timing means operatively connected respectively to said knives, said timing means each including cam means operated in time with the respective knife and in conformity with the length of the respective sheet and comprising a first cam for operating said sheet diverting means as each sheet in the respective stream passes said sheet diverting means, a second cam for de-energizing said sheet diverting means as the next succeeding sheet in the respective stream passes said sheet diverting means, a short sheet proximity cam having a relatively long cam surface located between said first and second cams and a long sheet proximity cam, two sets of limit switches actuated respectively by the cams of the two timing means, master switch means for said limit switches for selectively rendering the first, second and short sheet cams of each set and the long sheet cam of the other set operative, whereby either knife may be employed to cut either the long sheets or the short sheets, the operative long sheet cam being correlated to a location on each long sheet spaced from the trailing edge thereof by a distance approximately equal to the length of the short sheets, and control means normally rendering said sheet diverting means inoperative and including means operated only simultaneously by the two operative limit switches of said proximity cams for conditioning said sheet diverting means for operation by the operative limit switch of said first cams and de-energization by the operative limit switch of said second cams.

9. In multiplex sheet handling apparatus having a delivery section for a plurality of parallel streams of spaced sheets and an overlap section for overlapping the sheets in each stream, the improvement comprising sheet diverting means between said sections for selectively diverting sheets from said streams away from said overlap section, said overlap section including means for moving overlapped sheets away from an overlap station comprising a single drive means having segmental parts correlated respectively to said streams and brake and clutch means for each of said segmental parts, and a plurality of sensing means operatively correlated respectively to said streams and coupled to the respective brake and clutch means for stopping the respective segmental part when the sheet preceding a diverted sheet in the respective stream in in overlap position and for starting the respective segmental part when the sheet following a diverted sheet in the respective stream reaches overlap position.

10. In multiplex sheet handling apparatus having a delivery section for a plurality of parallel streams of spaced sheets and an overlap section for overlapping the sheets in each stream, the sheets in each stream being of the same length but the sheets of the different streams being of different lengths; the improvement comprising a single sheet diverting means between said sections extending transversely of said streams for selectively diverting sheets away from said overlap section, a plurality of timing means operatively correlated respectively to said streams, said timing means each including control means periodically rendered operative in timed relation to movement of the respective stream for sensing the time at which the leading edge of each sheet in the respective stream will approach said sheet diverting means, actuating means for said sheet diverting means controlled by said control means and conditioned thereby for actuation when the control means of all the timing means sense a time at which the leading edges of sheets in all of said streams will approximately simultaneously approach said sheet diverting means for causing at least one sheet in each stream to be diverted away from said overlap section, said overlap section including means for moving the sheets in each of said streams and brake means for each of said sheet moving means, and a plurality of sensing means operatively correlated respectively to said streams and coupled to the respective brake means for stopping the respective sheet moving means when the sheet preceding a diverted sheet in the respective stream is in overlap position and for starting the respective sheet moving means when the sheet following a diverted sheet in the respective stream reaches overlap position.

11. In multiplex sheet handling apparatus having a delivery section for a plurality of parallel streams of spaced sheets and an overlap section for overlapping the sheets in each stream, the sheets in each stream being of the same length but the sheets of the diffferent streams being of different lengths; the improvement comprising a single sheet diverting means between said sections extending transversely of said streams for selectively diverting sheets away from said overlap section, a plurality of timing means operatively correlated respectively to said streams, said timing means each including control means periodically rendered operative in timed relation to movement of sheets in the respective stream for sensing the time at which the leading edge of each sheet in the respective stream will approach said sheet diverting means, actuating means for said sheet diverting means controlled by said control means and conditioned thereby for actuation when the control means of all the timing means sense a time at which the leading edges of sheets in all of said streams will approximately simultaneously approach said sheet diverting means for causing one sheet in each stream to be diverted away from said overlap section, said overlap section including a single overlap station, means for moving overlapped sheets away from said station comprising a single drive means having segmental parts correlated respectively to said streams, brake and clutch means for each of said segmental parts, and a plurality of sensing means operatively correlated respectively to said streams and coupled to the respective brake and clutch means for stopping the respective segmental part when the sheet preceding a diverted sheet in the respective stream is in overlap position and for starting the respective segmental part when the sheet following a diverted sheet in the respective stream reaches overlap position.

12. In multiplex sheet handling apparatus having a delivery section for a plurality of parallel streams of spaced sheets and an overlap section for overlapping the sheets in each stream, the improvement comprising sheet diverting means between said sections for selectively diverting sheets from said streams away from said overlap section, said overlap section including a single overlap station and a plurality of conveyor means adjacent said station; a drive roller for said conveyor means comprising a supporting shaft, a plurality of roller parts journalled on said shaft and mounting respective conveyor means, and brake means between each of said parts and said shaft; said roller parts and the conveyor means mounted thereon being correlated respectively to said streams for conveying the overlapped sheets of the respective streams away from said station; drive means for said roller parts comprising input means and a plurality of motion transmitting means each including clutch means extending between said input means and respective ones of said roller parts; and a plurality of sensing means operatively correlated respectively to said streams and responsive to diversion of sheets from the respective streams, said sensing means being coupled respectively to the respective brake and clutch means for stopping the respective roller part and conveyor means when the sheet preceding a diverted sheet in the respective stream is in overlap position and for starting the respective roller part and conveyor means when the sheet following a diverted sheet in the respective stream reaches overlap position.

13. In multiplex sheet handling apparatus having a delivery section for a plurality of parallel streams of spaced sheets and an overlap section for overlapping the sheets in each stream, the improvement comprising sheet diverting means between said sections for selectively diverting sheets from said streams away from said overlap section, said overlap section including a single overlap station, a plurality of conveyor tapes adjacent said station for conveying overlapped sheets away from said station; a drive roller for said tapes comprising a supporting shaft, a plurality of tape supporting discs journalled on said shaft and mounting respective tapes, said discs being selectively coupled in sets in correlation with said streams, and brake means between each set of discs and said shaft; drive means for said sets of discs comprising input means, a plurality of speed control devices driven by said input means and a plurality of motion-transmitting means each including clutch means extending between respective ones of said speed control devices and said sets of discs, and a plurality of sensing means operatively correlated respectively to said streams and responsive to diversion of sheets from the respective streams, said sensing means being coupled respectively to respective brake and clutch means for stopping respective sets of discs and tapes when the sheet preceding the diverted sheet in the respective stream is in overlap position and for starting the respective set of discs when the sheet following a diverted sheet in the respective stream reaches overlap position.

14. In multiplex sheet handling apparatus having a plurality of streams of sheets moving in parallel relation to one another and including means for varying the size of the sheets in each stream, adjustable sheet conveying means comprising a plurality of spaced parallel sheet conveying tapes; an adjustable drive roller for said tapes comprising a supporting shaft, a plurality of drive collars journalled on said shaft, and a plurality of tape supporting discs between adjacent pairs of said collars, all but one of said discs including means on the opposite faces thereof for detachable connection with adjacent discs and said collars, said one disc comprising a split ring including coupling means accommodating disassembly of the disc from the shaft and assembly of the disc on the shaft between any adjacent pair of the remainder of the discs, said split ring having bearing means at at least one face thereof accommodating relative rotation between itself and the disc adjacent thereto, whereby the one disc divides the discs between adjacent pairs of collars into two separate sets of adjustable width each coupled to a respective collar; brake means between each collar and said shaft; and a plurality of variable speed drive means, each including clutch means, coupled respectively to said collars.

15. In multiplex sheet handling apparatus having a plurality of streams of sheets moving in parallel relation to one another and including means for varying the size of the sheets in each stream, adjustable sheet conveying means comprising a plurality of spaced parallel sheet conveying tapes and an adjustable drive roller therefor, said roller comprising a supporting shaft, a plurality of drive collars journalled on said shaft, means for rotating each of said collars, and a plurality of tape supporting discs between adjacent pairs of said collars, all but one of said discs including means on the opposite faces thereof for detachable connection with the adjacent discs and said collars, said one disc comprising a split ring including coupling means accommodating disassembly of the disc from the shaft and assembly of the disc on the shaft between any adjacent pair of the remainder of the discs, said split ring having bearing means at at least one face thereof accommodating relative rotation between itself and the disc adjacent thereto, whereby the one disc divides the discs betwen adjacent pair of collars into two separate sets of adjustable widths each coupled to a respective collar.

16. In multiplex sheet handling apparatus having a delivery section for a pluarlity of parallel streams of spaced sheets, an overlap section for overlapping the sheets in each stream and means for varying the length and width of the sheets in each stream, said means for each setting thereof maintaining the sheets in each stream of the same size; the improvement comprising a single sheet diverting means between said sections extending transversely of said streams for selectively diverting sheets simultaneously from all said streams away from said overlap section; a plurality of timing means operatively correlated respectively to said streams, said timing means each including control means periodically rendered operative in timed relation to movement of sheets in the respective stream for sensing the time at which the leading edge of each sheet in the respective stream will approach said sheet diverting means; actuating means for said sheet diverting means controlled by said control means and conditioned thereby for actuation when the control means of all the timing means sense a time at which the leading edges of sheets in all of said streams will approximately simultaneously approach said sheet diverting means for causing at least one sheet in each stream to be diverted away from said overlap section; said overlap section including a single overlap station; a plurality of conveyor tapes adjacent said station for conveying overlapped sheets away from said station; a drive roller for said tapes comprising a supporting shaft, a plurality of drive collars journalled on said shaft, and a plurality of tape supporting discs between adjacent pairs of said collars, all but one of said discs including means for detachable connection with adjacent discs on said collars, said one disc comprising a split ring including coupling means accommodating disassembly of the disc from the shaft and assembly of the disc on the shaft between any adjacent pair of the remainder of the discs, said split ring having bearing means at at least one face thereof accommodating relative rotation between itself and the disc adjacent thereto, whereby the one disc divides the discs between adjacent pairs of collars into two separate sets of adjustable width each coupled to a respective collar; brake means between each collar and said shaft; a plurality of variable speed drive means, each including clutch means, coupled respectively to said collars; and a plurality of sensing means operatively correlated respectively to said streams and responsive to diversion of sheets from the respective streams, said sensing means being coupled respectively to respective brake and clutch means for stopping the respective set of discs and tapes when the sheet preceding a diverted sheet in the respective stream is in overlap position and for starting the respective set of discs and tapes when the sheet following a diverted sheet in the respective stream reaches overlap position.

17. In multiplex sheet handling apparatus having a plurality of streams of sheets moving in side-by-side relation in a given direction, the sheets in each stream being of the same size and the sheets of the different streams being of different sizes, means for moving the sheets in said streams in a normal path, means for selectively diverting sheets in said streams from said normal path, and a layboy for receiving said diverted sheets, said layboy comprising a frame, a plurality of longitudinally reciprocable transverse bars in said frame below the top thereof, a plurality of stop fingers removably supported on said bars for variable disposition lengthwise of the layboy and the diverted sheets in conformity with the length of the sheets in the respective streams, a plurality of transversely adjustably longitudinally extending divider boards removably mounted on said frame and adjustably correlated to the width of the sheets in the respective streams, and surfacing means on the top of said frame accommodating extension therethrough of said fingers and boards.

18. Automatic sheet sampling means for duplex cutters having means for slitting a wide web into two narrower webs of variable widths, a pair of knives for respectively cutting the two webs into relatively short sheets and relatively long sheets, a delivery section for conveying the sheets from said knives in parallel respective streams of spaced sheets in a normal path of movement, and an overlap section for receiving the sheets from said delivery section and overlapping the sheets in each stream; a single sheet diverting means extending transversely of said streams between said sections for selectively diverting sheets simultaneously from both said streams, a pair of timing means operatively connected respectively to said knives, said timing means each including cam means operated in time with the respective knife and in conformity with the length of the respective sheet, the timing means operatively associated with the short sheet knife including a first cam for operating said sheet diverting means as each short sheet passes said sheet diverting means, a second cam for de-energizing said sheet diverting means as the next succeeding short sheet passes said sheet diverting means and a short sheet proximity cam having a relatively long cam surface located between said first and second cams, the timing means operatively associated with the long sheet knife including a long sheet proximity cam operatively correlated to a location on each long sheet spaced from the trailing edge thereof by a distance approximately equal to the length of the short sheets, control means normally rendering said sheet diverting means inoperative and including means operated only by both said proximity cams for conditioning said sheet diverting means for energization by said first cam and de-energization by said second cam for diverting one long sheet and one short sheet simultaneously from the normal path of sheet movement; a layboy for receiving said diverted sheets, said layboy comprising a frame, a pair of longitudinally reciprocable transverse bars in said frame, a plurality of stop fingers removably supported on said bars for variable disposition lengthwise of the layboy in conformity with the length of the sheets in the respective streams, three transversely adjustable longitudinally extending divider boards removably mounted on said frame and adjustably correlated to the width and location of the sheets in the respective streams, and surfacing means on said frame accommodating extension therethrough of said fingers and said boards; said overlap section including a single overlap station normally receiving sheets from said delivery section, adjustable conveyor means for causing overlapping of the sheets in each of said streams at said station and for conveying the overlapped sheets away from said station, said conveyor means comprising a pair of adjustable segmental parts correlated respectively to the sheets in the respective streams, brake means for each of said parts, variable speed drive means including clutch means for each of said parts, and a pair of sensing means operatively correlated respectively to said streams and coupled to the respective brake and clutch means for stopping the respective segmental part when the sheet preceding a diverted sheet in the respective stream is in overlap position and for starting the respective segmental part when the sheet following the diverted sheet in the respective stream reaches overlap position.

No references cited.

ANDREW R. JUHASZ, *Primary Examiner.*